Sept. 3, 1957     J. M. GLADD ET AL     2,805,318
WELDING APPARATUS
Filed July 26, 1955     3 Sheets-Sheet 3
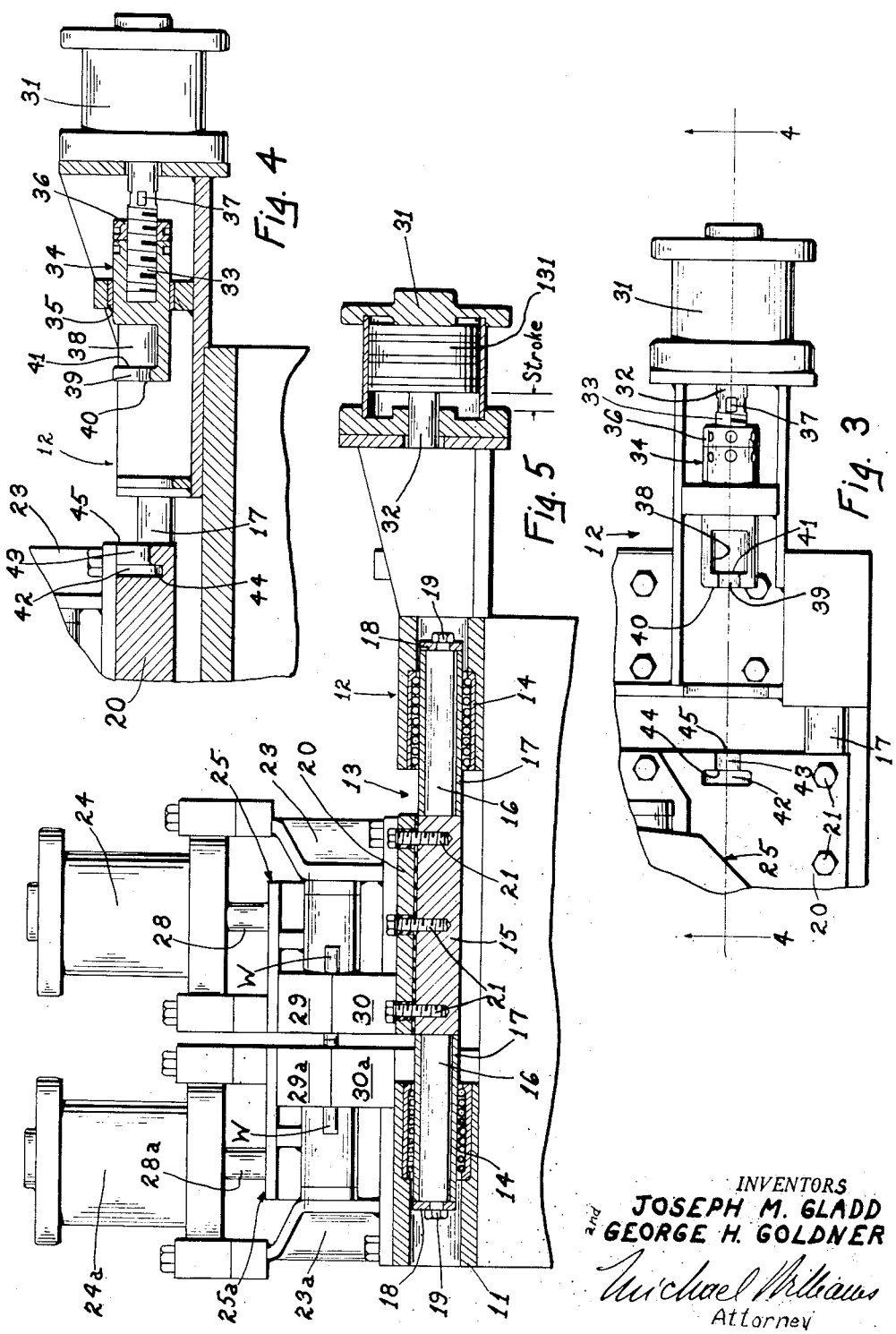
INVENTORS
JOSEPH M. GLADD
and GEORGE H. GOLDNER
Attorney

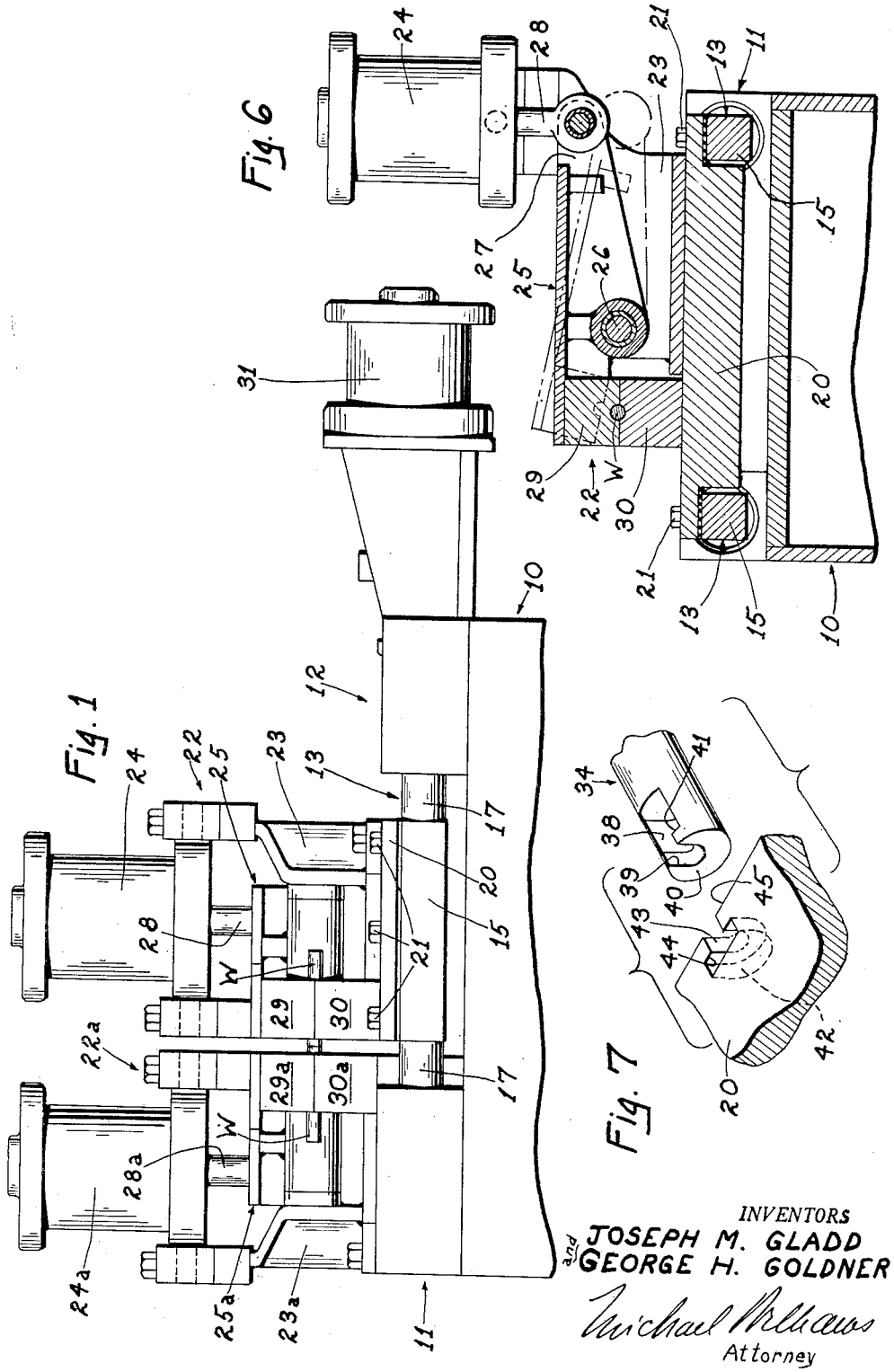

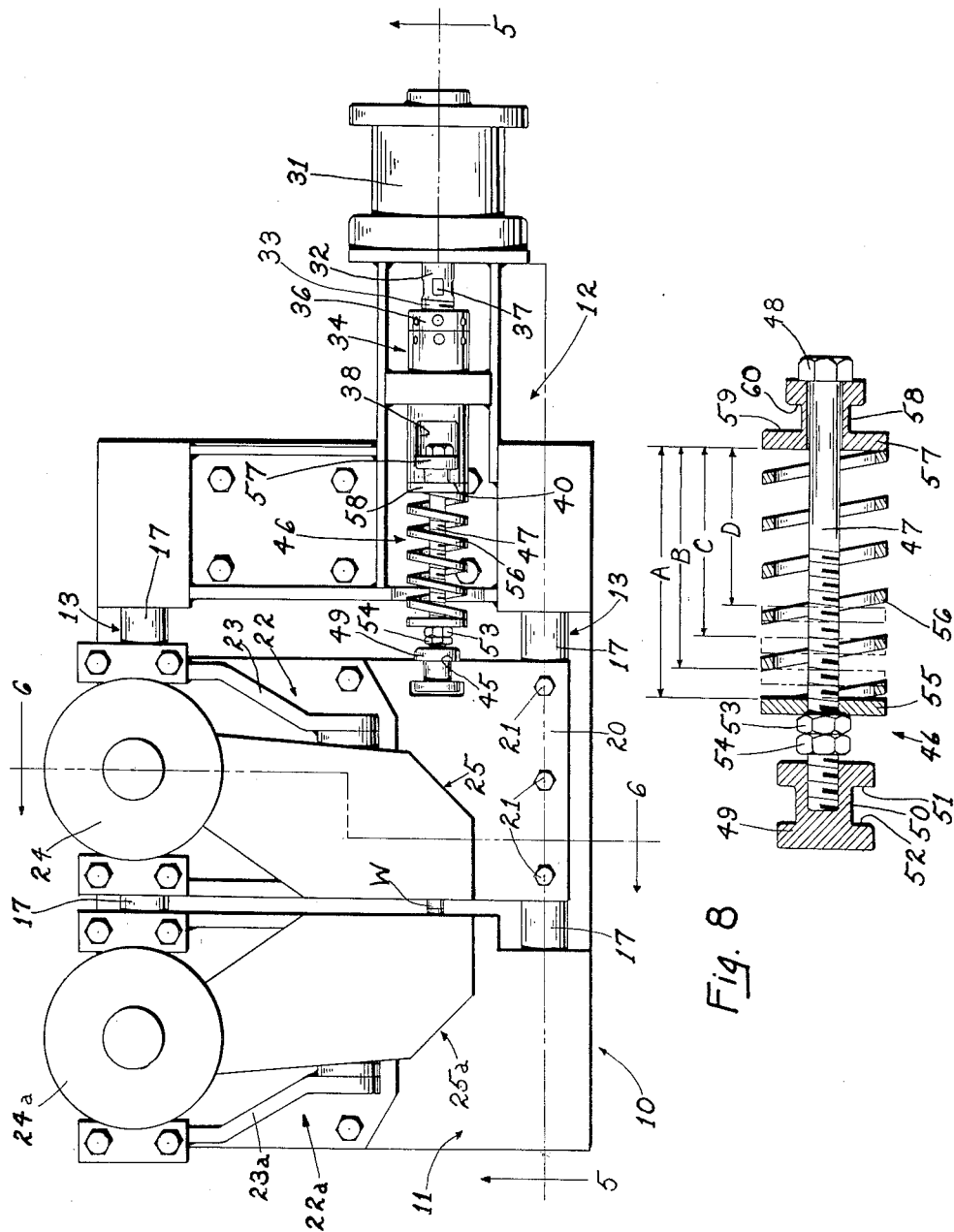

United States Patent Office 2,805,318
Patented Sept. 3, 1957

2,805,318

WELDING APPARATUS

Joseph M. Gladd and George H. Goldner, Warren, Ohio, assignors to The Federal Machine and Welder Company, Warren, Ohio, a corporation of Ohio Application July 26, 1955, Serial No. 524,448

9 Claims. (Cl. 219—101)

The present invention relates to welding apparatus, more particularly to electric resistance welding apparatus, and the principal object of the invention is to provide new and improved apparatus of the character described.

Most prior art electric resistance welding apparatus has been characterized by a lack of flexibility; that is, apparatus having sufficient capacity for heavy work is unsuitable for performing light work. This, it will be appreciated, often leads to expensive duplication of welding equipment where a wide range of work must be handled. Lack of flexibility has particularly been a problem in butt welding where the necessary forging pressures may range from but a few pounds or less when joining small wires to a thousand pounds or more when joining large rods. The problem is further complicated when small wires are to be joined since such work requires very precise control of both the magnitude and application of the forging pressure.

The present invention provides welding apparatus which, in the presently disclosed embodiment, is adapted to butt weld a wide range of materials since the forging pressure exerted by the apparatus may be quickly and easily adjusted to suit requirements. Moreover, apparatus constructed in accordance with the present invention provides for very precise control of the magnitude of the forging pressure and for fast follow-up as the work softens. These and other advantages will readily become apparent from a study of the following description and from the drawings appended hereto.

In the drawings accompanying this specification and forming a part of this application, there is shown, for purpose of illustration, an embodiment which the invention may assume, and in these drawings:

Figure 1 is a side elevational view of apparatus constructed in accordance with the present invention, Figure 2 is a top plan view of such apparatus, Figure 3 is a fragmentary view, similar to Figure 2, but with certain parts removed, Figure 4 is a fragmentary sectional view generally corresponding to the line 4—4 of Figure 3, Figure 5 is a longitudinal sectional view generally corresponding to the line 5—5 of Figure 2, Figure 6 is a transverse sectional view generally corresponding to the line 6—6 of Figure 2, Figure 7 is a fragmentary separated perspective view of details, and Figure 8 is an enlarged, sectional view of another detail.

The present invention, although herein disclosed as being applied to an upset butt welder, is equally adaptable to other welders such as flash welders, spot welders and the like or in any apparatus wherein precise, easily adjustable control of pressure over a wide range is desirable.

As best seen in Figures 1 and 2, the presently disclosed apparatus comprises a base 10 to the top of which structures 11 and 12 are secured in spaced-apart relation and by any suitable means. As herein shown, structure 11 may take the form of a relatively thick plate, whereas structure 12 may take the form of a weldment. Structures 11 and 12 are adapted to receive a pair of parallel, spaced slide bars 13 and, in order to reduce friction to a minimum, each structure carries a suitable, commercially available, linear type bearing 14 having balls, or rollers, for supporting respective ends of the slide bars.

With reference to Figures 5 and 6, and in the present embodiment, each slide bar 13 has an intermediate portion 15 which is square in cross section and end portions 16 which are round in cross section. A hardened sleeve 17, whose exterior fits within bearings 14, is adapted to be positioned on each bar portion 16 and maintained in position by means of a washer 18 and a suitable capscrew 19 which passes through an aperture in the washer and which threads into the bar. For a purpose to appear, a plate 20 extends across the slide bars 13 and is secured thereto by means of capscrews 21 to provide a unitary assembly. Plate 20 is electrically insulated from slide bars 13 by means of any suitable dielectric material. From the foregoing it is to be understood that plate 20 is rigidly mounted for rectilinear movement between structures 11 and 12 since it is affixed to the spaced slide bars 13.

The herein disclosed butt welding apparatus is broadly similar to that heretofore known in that it comprises means for securely holding the work pieces to be joined, means for pushing the work pieces together to provide for welding thereof, and means for passing current through the work to raise its temperature to the level required for welding. As best seen in Figures 1, 2, 5 and 6, a pair of work holding devices 22, 22a are employed to hold the work to be welded which, as herein illustrated, comprises two rods W. Since the devices 22, 22a are similar, but of opposite hand for a purpose to appear, only device 22 will be described in detail, it being understood that the parts of device 22a corresponding with like parts of device 22 are identified by the same reference numeral but with the suffix "a" added.

Device 22 (see Figures 1 and 6) comprises a bracket 23 which is secured to the top of plate 20 by any suitable means and which pivotally supports a trunnion mounted fluid cylinder 24. An arm 25 is carried by bracket 23 for pivotal movement about the axis of a rock shaft 26, and one portion 27 of arm 25 is pivotally secured to the piston rod 28 of cylinder 24, whereas another portion of arm 25 has a clamping member 29 suitably secured thereto. Clamping member 29 cooperates with a clamping member 30 suitably secured to plate 20.

It is to be understood that clamping members 29, 30, often called electrodes, are so formed that they will firmly grip the work and hold it in predetermined relation and one or both of the members are preferably formed of a high copper content alloy or the like so that current may be fed therethrough to the clamped work with a minimum of loss. Although not shown, the electrodes, or clamping members 29 and 30, will be readily replaceable to provide for wear and to permit easy replacement of the members with others required to accommodate different types of work.

As before mentioned, work holding device 22a is similar to device 22; however, bracket 23a and clamping member 30a are secured to fixed structure 11 instead of to plate 20. Clearly, movement of plate 20 in the manner described carries work holding device 22 and the work piece W clamped thereby toward and away from work holding device 22a and the work W clamped by the latter device.

Utilizing the generic term "slide" to refer to plate 20 and the parts affixed thereto, the means presently employed to effect movement of the slide comprises a fluid cylinder 31, having a piston 131, secured and insulated by any suitable means to structure 12. As will be apparent, the axis of cylinder 31 is parallel with the axes of slide bars 13 and this cylinder is provided with a piston rod 32 whose outer extremity 33 is threaded to receive a member 34 which extends axially of the piston rod. As herein disclosed, member 34 is round in cross section and is slidable in an insulating bushing 35 (see Figure 4) carried by a portion of structure 12. An internally threaded collar 36 is also carried by portion 33 of piston rod 32, this collar abutting member 34 and serving as a jam nut to securely hold the member and the piston rod in predetermined adjusted relation. To facilitate adjustment of member 34 along the piston rod, both the member and collar 36 have a plurality of holes for receiving a suitable spanner wrench and the piston rod is provided with suitable wrench flats 37.

For a purpose to appear and as seen in Figures 2, 3, 4 and 7, the left end of member 34 (in the position of parts shown) is formed to provide a U-shaped, upwardly facing pocket, or recess, 38 which is spaced a short distance from such end. The extreme end of member 34 provides a recess 39 similar to 38; however, recess 39 is slightly smaller than recess 38 to provide an outwardly facing abutment surface 40 and an inwardly facing abutment surface 41.

A portion of plate 20 in axial alignment with member 34 has a recess 42 similar to recess 38, and a recess 43 similar to recess 39. Recesses 42, 43 provide an inwardly facing abutment surface 44 and an outwardly facing abutment surface 45.

Means are provided for connecting plate 20 with member 34 and, as best shown in Figure 8, such means comprises a resilient device 46 which, in its present form, includes the following parts: A bolt 47 with a head 48 at one end has a spool-like member 49 affixed to its other end in any suitable manner; for example, member 49 may be threaded onto the bolt end as shown. Spool-like member 49 has an annular groove 50 whose sides provide oppositely facing, radially extending surfaces 51 and 52. Also threaded on bolt 47 adjacent member 49 is an adjusting nut 53 which is adapted to be locked in position along the bolt by means of a jam nut 54. A washer 55 abuts nut 53 and forms a seat for one end of a compression spring 56 which encircles the bolt. The opposite end of spring 56 is seated against a member 57 which is slidable along the shank of the bolt and which is normally urged to abutment with bolt head 48 by means of spring 56. Member 57 is similar to member 49 in that it is formed with an annular groove 58 whose sides form oppositely facing radially extending surfaces 59, 60.

Positioning device 46 intermediate member 34 and plate 20 is simplicity itself. All that is necessary is to drop the device in place so that groove 58 of member 57 straddles abutment surfaces 40, 41 of member 34 and so that groove 50 of spool-like member 49 straddles abutment surfaces 44, 45 of plate 20 (see Figure 2). With device 46 thus positioned the force exerted by piston rod 32 of cylinder 31 will be transmitted to plate 20 and the parts carried thereby.

Assuming that adjusting nut 53 of device 46 is locked in position along bolt 47 to place spring 56 under the desired initial compression; that device 46 is positioned in the recesses provided by member 34 and plate 20; and that piston 131 of cylinder 31 is in the extreme right-hand position shown in Figure 5, operation of the apparatus will be as follows:

Cylinders 24, 24a of the work holding devices 22, 22a will be operated to separate the respective clamping members 29, 30 and 29a, 30a of such work holding devices (see the dot dash position of arm 25 shown in Figure 2) to permit insertion of the work to be welded. Cylinders 24, 24a will then be actuated to clamp the work pieces tightly between the respective members 29, 30 and 29a, 30a. Since the apparatus herein disclosed is an upset butt welder, the adjoining ends of the work pieces to be welded are positioned in abutting relation so that current will flow therebetween. However, it is to be understood that in apparatus such as flash welders, it may be desirable to separate the work pieces slightly so that current will jump the gap therebetween.

With the work pieces tightly clamped, fluid under pressure will be admitted to the blank end of cylinder 31 to force piston 131 to the left. Substantially simultaneously, current from a suitable source controlled by well-known apparatus not forming a part of the present invention will be passed through the work pieces to raise their temperatures. In the present embodiment, piston 131 has a predetermined length of stroke (see Figure 5) and sufficient pressure is exerted by the motive fluid so that the piston will immediately shift to the left to the limit of its movement.

As piston 131 shifts to the left, abutment surface 40 of the member 34 which is secured to piston rod 32 will force member 57 to the left against the resiliency of spring 56. Accordingly, spring 56 will be deflected a predetermined amount in absorbing the stroke of piston 131. Under such deflection, spring 56 will force the work pieces together with predetermined force since it exerts pressure on abutment surface 45 of plate 20 through washer 55, nut 53, bolt 47 and member 49. Since the total deflection of spring 56 is the sum of its initial deflection plus that effected by piston 131, and since the pressures exerted by the spring at various deflected positions are known values, any desired pressure may be achieved merely by adjusting nut 53 to, for example, initially deflect spring 56 to the various positions indicated in Figure 8 (in the event the desired pressure falls within the working range of the spring employed) or by substituting other resilient devices having the required spring characteristics.

Since the resilient device 46 may readily be lifted from its normal position in the recesses of member 34 and plate 20 to adjust the initial tension on spring 56 or to replace the device with another having different spring characteristics, it will be appreciated that the apparatus herein disclosed is quickly and easily adjustable to exert the optimum pressure.

As the adjoining ends of the work pieces soften as a result of current flow, the predetermined pressure exerted by spring 56 will immediately force the two pieces together. The current will then be cut off, the work holding devices opened to permit removal of the work, and piston 131 returned to the right to await the next cycle of operation.

An important feature of the present invention is its consistently accurate pressure and quick follow-up characteristics. This is due largely to the fact that the slide is mounted for low friction movement on the rollers provided by bearings 14 and that the slide is moved directly by the spring 56 and only indirectly by cylinder 31. It will be appreciated that in the event the cylinder were connected directly to the slide and the pressure exerted on the work controlled by regulating the pressure of the fluid admitted to the cylinder, the amount of force exerted by the cylinder would be erratic due to the internal friction of the cylinder. Furthermore, follow-up would be sluggish for the same reason. This would be particularly true when welding small wires or the like which require very accurately controlled, relatively light forging pressures.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:

1. Welding apparatus comprising a pair of relatively movable electrodes between which the work is adapted to be positioned, means for urging said electrodes in a direction toward each other, including power means exerting a driving force and a resilient assembly for receiving such force and for translating it to said electrodes, said resilient assembly having end portions yieldably maintained in predetermined spaced relation, and means providing spaced, relatively movable seats engageable with respective end portions of said resilient assembly and through which said driving force is exerted on the latter and translated to said electrodes, one of said means having a transversely extending slot intersecting its seat and through which said resilient assembly is shiftable transversely of its axis to and from translating relation between said seats to provide for ready replacement of said resilient assembly whereby resilient assemblies of various values may be quickly positioned in translating relation.

2. Welding apparatus comprising a pair of relatively movable electrodes between which the work is adapted to be positioned, means for urging said electrodes in a direction toward each other, including power means exerting a driving force and a resilient assembly for receiving such force and for translating it to said electrodes, said resilient assembly having end portions yieldably maintained in predetermined spaced relation, and means providing spaced, relatively movable, oppositely facing seats engageable with respective end portions of said resilient assembly and through which said driving force is exerted on the latter and translated to said electrodes, said means having transversely extending slots intersecting respective seats and through which said resilient assembly is shiftable transversely of its axis to and from translating relation between said seats to provide for ready replacement of said resilient assembly whereby resilient assemblies of various values may be quickly positioned in translating relation.

3. Welding apparatus comprising a pair of electrodes, one of which is movable toward and away from the other and between which the work is adapted to be positioned, a slide carrying said movable electrode, and means for urging said slide and the electrode carried thereby in a direction toward said other electrode, including power means having a predetermined amount of travel and a resilient assembly having end portions yieldably maintained in predetermined spaced relation for absorbing said travel and for translating said travel into a predetermined amount of thrust urging said electrodes together when deflected by said power means, said slide and a portion of said power means providing spaced seats engageable with respective end portions of said resilient assembly and through which the thrust of the latter is translated to said movable electrode, the respective seat-providing portions of said slide and said power means having transversely extending slots intersecting respective seats and through which said resilient assembly is shiftable transversely of its axis to and from translating relation between said seats to provide for ready replacement of said resilient assembly whereby resilient assemblies of various values may be quickly positioned in translating relation.

4. Welding apparatus comprising a pair of electrodes, one of which is movable toward and away from the other and between which the work is adapted to be positioned, a slide carrying said movable electrode, roll means supporting said slide for low friction movement, means for urging said slide and the electrode carried thereby in a direction toward said other electrode, including power means having a predetermined amount of travel and a resilient assembly having end portions yieldably maintained in predetermined spaced relation by means of a spring for absorbing said travel and for translating said travel into a predetermined amount of thrust urging said electrodes together when deflected by said power means, and means for adjusting the tension on said spring while maintaining the predetermined spaced relation of said end portions, said slide and a portion of said power means providing spaced seats engageable with respective end portions of said resilient assembly and through which the thrust of the latter is translated to said movable electrode, the respective seat-providing portions of said slide and said power means having transversely extending slots intersecting respective seats and through which said resilient assembly is shiftable transversely of its axis to and from translating relation between said seats to facilitate adjustment of the tension on its spring and to provide for ready replacement of said resilient assembly whereby resilient assemblies of various values may be quickly positioned in translating relation.

5. Welding apparatus comprising a pair of relatively movable electrodes between which the work is adapted to be positioned, power means for urging one of said electrodes toward the other, a pair of relatively movable members each having a seat and adapted to be positioned and maintained with said seats in predetermined spaced-apart relation to provide for translation of the thrust of said power means to said electrode, and means for yieldably maintaining said members in said position and having a pair of spaced abutments engageable with respective seats, said abutments being yieldably urged to a predetermined position wherein their spacing substantially coincides with the spacing of said seats to provide for ready assembly and disassembly of said means with said member.

6. Welding apparatus comprising a pair of relatively movable electrodes between which the work is adapted to be positioned, power means for urging one of said electrodes toward the other and capable of exerting a thrust in excess of that desired, a pair of relatively movable members each having a seat and adapted to be positioned and maintained with said seats in predetermined spaced-apart relation to provide for translation of the thrust of said power means to said electrode, and resilient means for yieldably maintaining said members in said position and having a pair of spaced abutments engageable with respective seats, said resilient means deflecting under excess thrust exerted by said power means and providing for relative movement of said members to absorb such excess thrust and limit the force exerted on said electrode to a predetermined value and said resilient means abutments being yieldably urged to a predetermined position wherein their spacing substantially coincides with the spacing of said seats to provide for ready assembly and disassembly of said resilient means with said members.

7. Welding apparatus comprising a pair of relatively movable electrodes between which the work is adapted to be positioned, power means for urging one of said electrodes toward the other and capable of exerting a thrust in excess of that desired, a pair of relatively movable members each having a seat and adapted to be positioned and maintained with said seats in predetermined spaced-apart relation to provide for translation of the thrust of said power means to said electrode, and resilient means comprising a resilient member for yieldably maintaining said members in said position and having a pair of spaced abutments engageable with respective seats, said resilient member deflecting under excess thrust exerted by said power means and providing for relative movement of said members to absorb such excess thrust and limit the force exerted on said electrode to a predetermined value, said resilient means abutments being yieldably urged by said resilient member to a predetermined position wherein their spacing substantially coincides with the spacing of said seats to provide for ready assembly and disassembly of said resilient means with said members.

8. Welding apparatus comprising a pair of relatively movable electrodes between which the work is adapted to be positioned, power means for urging one of said electrodes toward the other and capable of exerting a thrust in excess of that desired, a pair of relatively movable members each having a seat and adapted to be positioned and maintained with said seats in predetermined spaced-apart relation to provide for translation of the thrust of said power means to said electrode, resilient means comprising a resilient member for yieldably maintaining said members in said position and having a pair of spaced abutments engageable with respective seats, said resilient member deflecting under excess thrust exerted by said power means and providing for relative movement of said members to absorb such excess thrust and limit the force exerted on said electrode to a predetermined value, said resilient means abutments being yieldably urged by said resilient member to a predetermined position where their spacing substantially coincides with the spacing of said seats to provide for ready assembly and disassembly of said resilient means with said members, and adjustment means carried by said resilient means for varying the force exerted by said resilient means on said members while said abutments are maintained in said predetermined position.

9. Welding apparatus comprising a pair of relatively movable electrodes between which the work is adapted to be positioned, power means for urging one of said electrodes toward the other and capable of exerting a thrust in excess of that desired, a pair of relatively movable members each having a seat and adapted to be positioned and maintained with said seats in predetermined spaced-apart relation to provide for translation of the thrust of said power means to said electrode, and resilient means for yieldably maintaining said members in said position and comprising a body carrying a pair of abutments engageable with respective seats and one of said abutments being movable relative to the other, a spring carried by said body and having one portion engaged with said one abutment to resiliently urge the latter to a predetermined position wherein its spacing from said other abutment substantially coincides with the spacing of said seats to provide for ready assembly and disassembly of said resilient means with said members, and means carried by said body and engaged with another portion of said spring and being adjustable along said body to vary the force with which said one abutment is urged to said position, said spring deflecting under excess thrust exerted by said power means and providing for relative movement of said abutments and said members to absorb such excess thrust and limit the force exerted on said electrode to a predetermined value.

References Cited in the file of this patent
UNITED STATES PATENTS

| | | |
|---|---|---|
| 1,174,446 | Rietzel | Mar. 7, 1916 |
| 1,736,617 | Muir | Nov. 19, 1929 |
| 2,417,075 | Hart | Mar. 11, 1947 |